Oct. 2, 1951 H. M. BARTON, JR 2,569,550

TUBE SOCKET FOR PRINTED CIRCUITS

Filed Dec. 20, 1948

INVENTOR.
H. M. BARTON, JR.

BY Hudson & Young

ATTORNEYS

Patented Oct. 2, 1951 2,569,550

UNITED STATES PATENT OFFICE 2,569,550

TUBE SOCKET FOR PRINTED CIRCUITS

Hugh M. Barton, Jr., Brooklyn, N. Y., assignor to Phillips Petroleum Company, a corporation of Delaware Application December 20, 1948, Serial No. 66,288

3 Claims. (Cl. 173—328)

This invention relates to a tube socket which is particularly adapted for use with electrical apparatus embodying printed electronic circuits.

Heretofore, in using tube sockets in connection with printed electronic circuits, difficulties have been encountered in making connections to the tube electrodes, particularly when an electrically shock-proof mounting for the tube is desired.

It is an object of this invention to provide a tube socket for printed electronic circuits which may be rapidly riveted in position upon a chassis without the necessity of connecting leads thereto.

It is a further object of the invention to provide a novel shock-proof mounting for such a tube socket.

It is a still further object of this invention to provide a tube socket for printed electronic circuits which is simple in construction, reliable, and easy to assemble in position upon a chassis.

Various other objects, advantages and features of the invention will become apparent from the following detailed description taken in conjunction with the accompanying drawings, in which.

Figure 1:
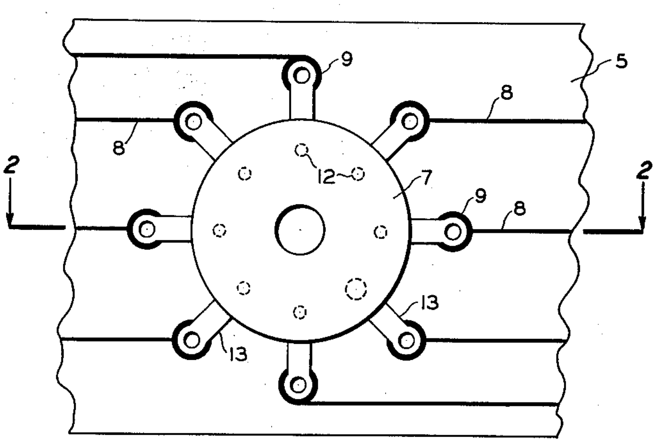
Figure 1 is a bottom view of the tube socket mounted upon a chassis.
Figure 2:
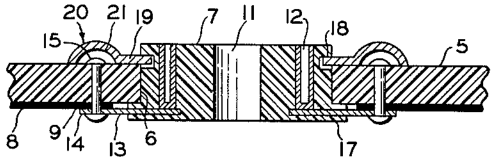
Figure 2 is a sectional view taken upon the lines 2—2 of Figure 1.
Figure 3:
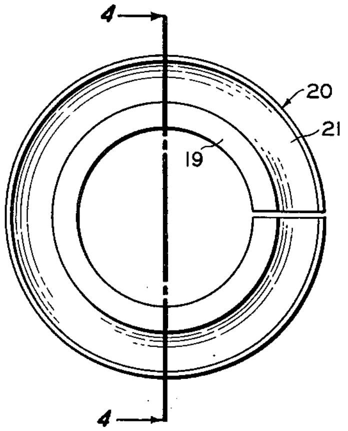
Figure 3 is a bottom view of the retainer ring.
Figure 4:
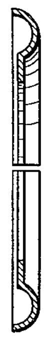
Figure 4 is a sectional view taken along the lines 4—4 of Figure 3.

Referring now to the drawings in detail, and particularly to Figure 1, I have shown a socket on chassis 5 of the type used in conjunction with printed electronic circuits. This chassis is provided with an opening 6 of proper dimensions to receive a tube socket 7 and leads 8 are printed on the underside of the chassis, each lead terminating in an enlarged circular portion 9 adjacent the opening 6, in position for connection to the tube electrodes. The leads 8 are formed from fine particles of conductive material which are in intimate engagement with the base 5 and, in effect, these leads form a part of the base after they are printed or otherwise formed thereon.

The tube socket 7 has a central opening 11 for receiving the guiding pin of an electron tube, not shown, and a series of jacks 12 of conductive metal are spaced around the opening 11 for connection to the electrodes of a tube through its base prongs. A lug 13 is mounted in the socket in electrical connection with each of the jacks 12, these legs being formed from flat strips of conductive metal and extending radially from the tube socket. The end portion 14 of each lug may be slightly enlarged and each such end portion has an opening positioned directly beneath one of the circular portions 9 of the printed conductors 8. Each lug is riveted to the corresponding conductor portion 8 by a rivet 15, thereby forming a positive electrical connection between the printed conductor and the corresponding tube electrode.

The tube socket 7 is resiliently mounted upon the base so as to prevent microphonic noises and other disturbances resulting from jarring or shock of the chassis and the electronic tubes carried thereby. To this end, the base of the tube socket has a flange 17 formed thereon which is adapted to engage the underside of the chassis 5 and a circumferential slot 18 is formed in the upper portion of the tube socket to receive an interior flanged portion 19 of a split resilient retaining ring 20. The circumferential region of the retaining ring is dished, as indicated at 21, and this dished portion fits over the rivets 15 to prevent short circuits therebetween and to prevent shocks resulting from touching the rivets. The ring also rigidly supports the socket upon the chassis.

It will be apparent that the socket may be readily assembled upon the chassis merely by inserting it upwardly through the opening 6 until flange 17 engages the underside of the chassis 5. Thereupon, split retainer ring 20 is snapped into position within the slot 18 to provide a convenient shock-proof mounting for the socket. The lugs 13 are then riveted to the conductors 8 to provide rapid and convenient electrical connections to the tube electrodes without the necessity of soldering leads or otherwise connecting the tube electrodes to the conductors. As a result, the socket is particularly adaptable for use in electronic devices embodying printed electrical circuits. In some cases, where protection against electrical shocks is not required, the dished portion 21 may be of reduced size and engageable with the base interiorly of the rivets 15.

While the invention has been described in connection with a present, preferred embodiment thereof, it is to be understood that this description is illustrative only and is not intended to limit the invention, the scope of which is defined by the appended claims.

Having described my invention, I claim:

1. The combination, with a flat base of insulating material having an opening formed therein for receiving a tube socket, and leads printed on said base for connection to the tube electrodes, of a tube socket of insulating material having a flanged base engageable with the lower side of said insulating base, a plurality of jacks of conductive material in said socket each adapted to receive a tube prong, a conductive lug secured to each jack and extending radially from said tube socket, a rivet for securing the outer end of each lug to said base in contact with one of said printed conductors, a circumferential slot formed in the upper part of said socket, and a split retainer ring of resilient material having a dished outer portion engageable with the upper side of said base to cover the exposed portions of said rivets and an interior flange fitting into said slot to resiliently hold the socket in position upon the base.

2. The combination, with a flat base of insulating material having an opening formed therein for receiving a tube socket, and leads printed on said base for connection to the tube electrodes, each lead terminating in an enlarged circular portion adjacent said opening, of a tube socket of insulating material having a flanged base engageable with the lower side of said insulating base, a plurality of jacks of conductive material in said socket, each adapted to receive a tube prong, a flat elongated conductive lug secured to each jack and extending radially from said tube socket, each lug terminating in a flat end portion positioned adjacent one of said circular portions, a rivet for securing each end portion to one of said circular conductor portions, and a split retainer ring of resilient material having a dished outer portion engageable with the upper surface of said base and an interior flange adapted to fit into a slot formed in the upper end of the tube socket, said ring resiliently holding the socket in position upon the base and covering the exposed portions of said rivets.

3. The combination, with a flat base of insulating material having an opening formed therein for receiving a tube socket, and leads for connection to the tube electrodes, of a tube socket of insulating material having a flanged base engageable with the lower side of said insulating base, a plurality of jacks of conductive material in said socket each adapted to receive a tube prong, a conductive lug secured to each jack and extending radially from said tube socket, a conductive member for securing the outer end of each lug to said base in contact with one of said conductors, a circumferential slot formed in the upper part of said socket, and a split retainer ring of resilient material having a dished outer portion engageable with the upper side of said base to cover the exposed portions of said conductive members and an interior flange fitting into said slot to resiliently hold the socket in position upon the base.

HUGH M. BARTON, Jr.

REFERENCES CITED

The following references are of record in the file of this patent:

UNITED STATES PATENTS

| Number | Name | Date |
|---|---|---|
| 1,787,084 | Meuer | Dec. 30, 1930 |
| 1,800,827 | Fuller | Apr. 14, 1931 |
| 2,059,077 | Alden | Oct. 27, 1936 |
| 2,087,784 | Schmitt | July 20, 1937 |
| 2,275,490 | Barber | Mar. 10, 1942 |
| 2,325,770 | Henderson | Aug. 3, 1943 |
| 2,441,960 | Eisler | May 25, 1948 |

FOREIGN PATENTS

| Number | Country | Date |
|---|---|---|
| 686,445 | France | Apr. 14, 1930 |